June 4, 1929.   J. T. TRAVERS   1,715,438
SEWAGE TREATMENT PLANT
Filed March 25, 1927   4 Sheets-Sheet 2
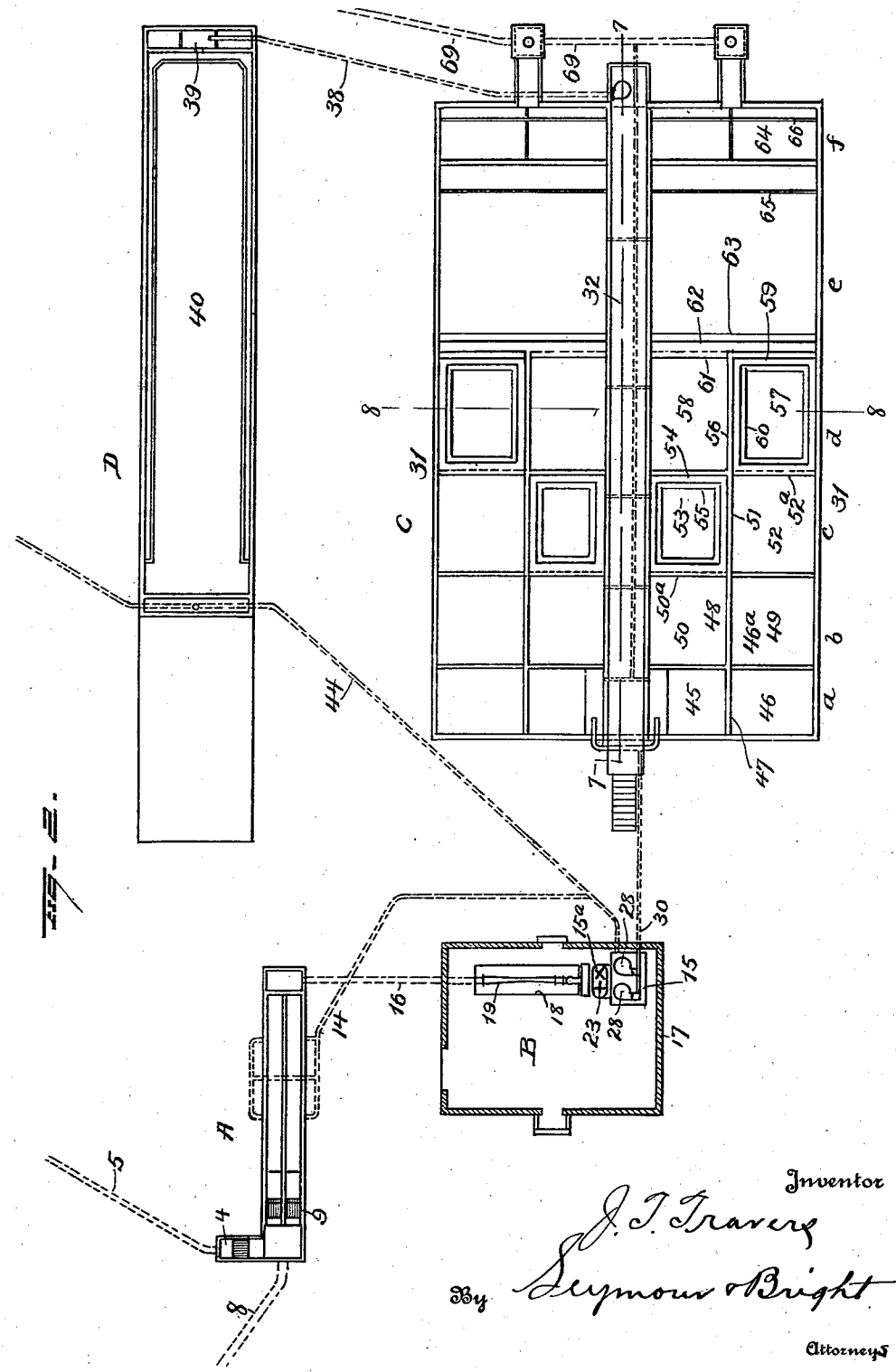

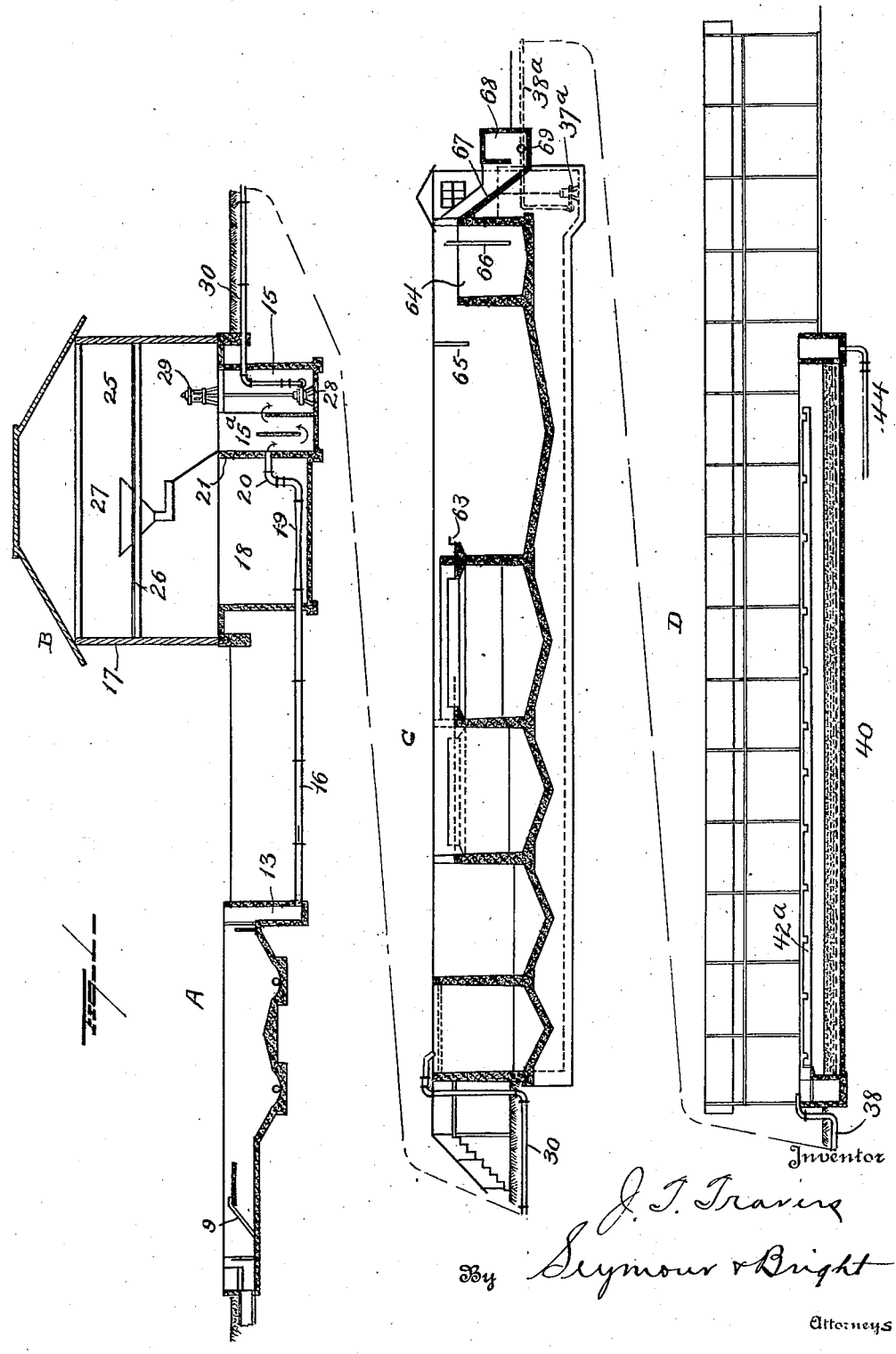

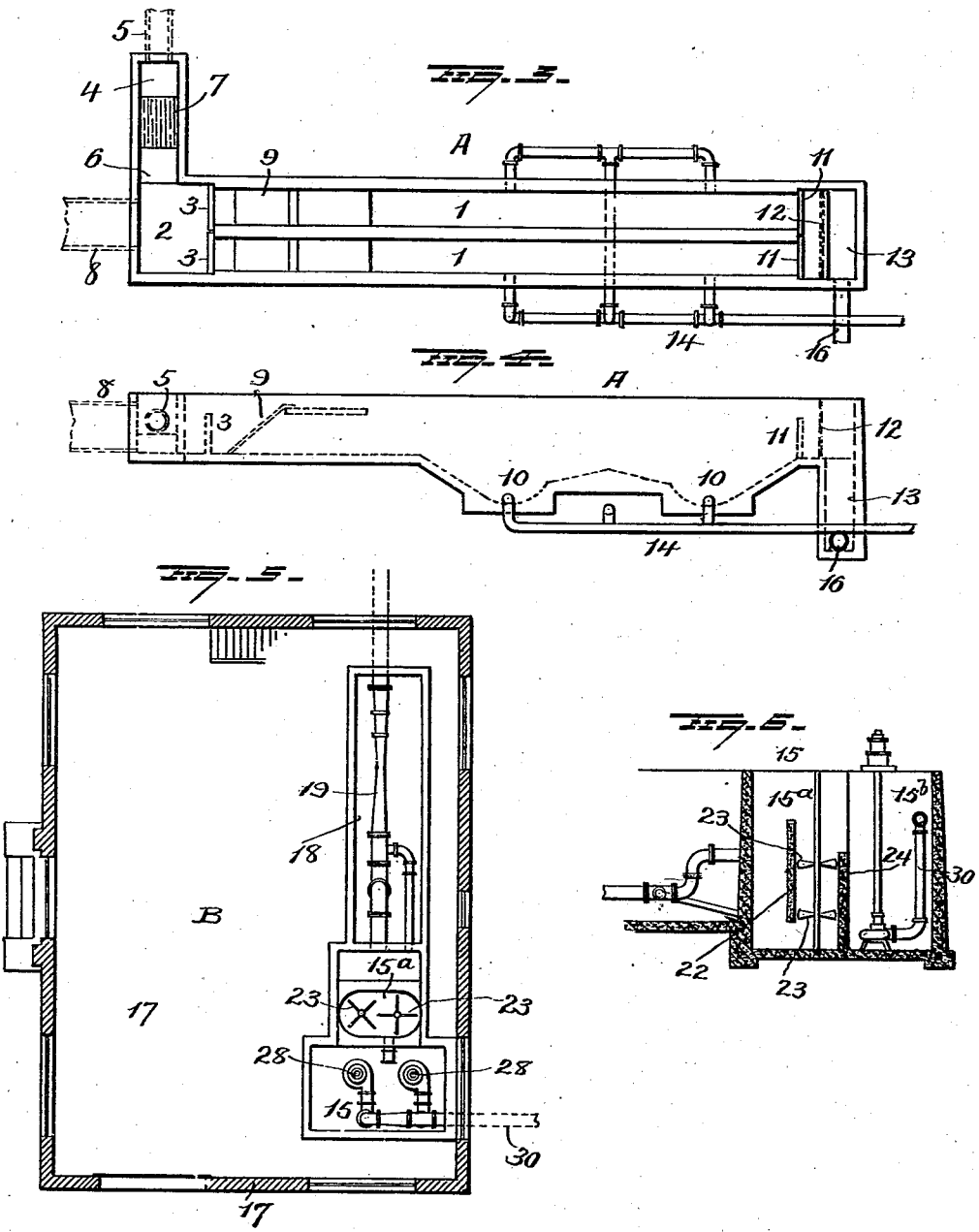

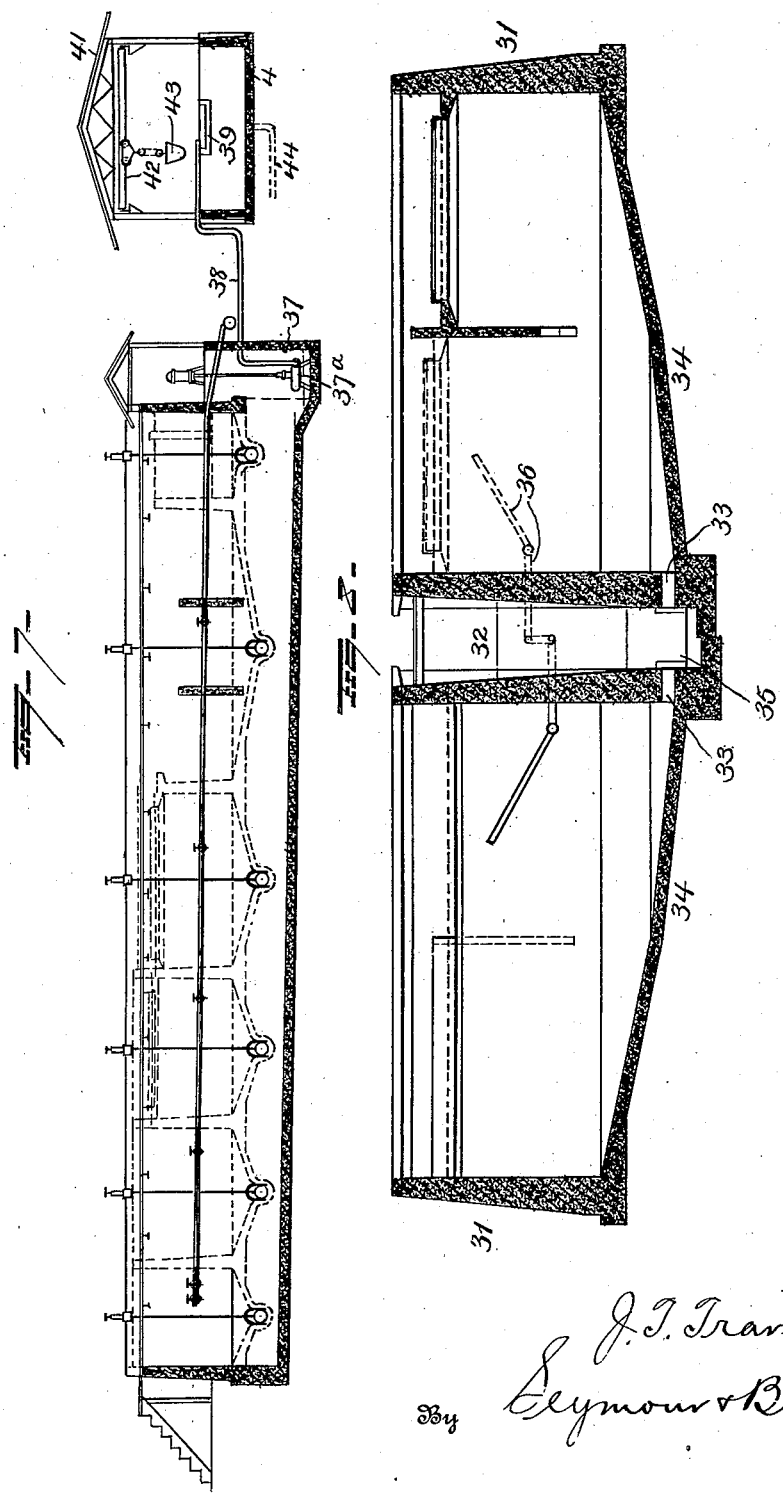

Patented June 4, 1929.

1,715,438

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO.

SEWAGE-TREATMENT PLANT.

Application filed March 25, 1927. Serial No. 178,416.

This invention relates to improvement in sewage treatment plants, one object of the invention being to provide a plant with the use of which domestic sewage or industrial waste shall be most effectually deprived of all such constituents as would render the liquid content detrimental to or contaminate a river or stream into which it may be discharged.

A further object is to provide an improved apparatus which shall operate effectually to so treat domestic sewage or industrial waste as to insure an effluent free from contaminating and odor producing ingredients.

A further object is to provide a plant in which domestic sewage or industrial waste shall first be deprived of grit, stones and similar solid materials; in which chemical material shall be properly mixed with the sewage or waste, and the latter, containing such chemical material, then caused to travel through settling chambers where the impurities are caused by reason of the chemical content of said sewage or waste, to coagulate and precipitate, and in which the purified effluent and the precipitate or sludge are discharged separately and the latter fed to a sludge bed or receptacle from which it may be recovered as a by-product.

A further object is to so construct a sewage or waste treatment plant that aeration of the water content of the same shall, while passing through said plant, be facilitated and augmented.

With these and other objects in view, the invention consists in certain novel features of construction and combinations of parts as hereinafter set forth and pointed out in the claims.

In the accompanying drawings;

Figure 1 is a sectional view illustrating my improved plant;

Figure 2 is a plan view;

Figure 3 is a plan view of the grit removing unit;

Figure 4 is a view in elevation of the apparatus shown in Figure 3, with internal features of construction shown in dotted lines;

Figure 5 is a transverse sectional view of a building in which certain mechanism of the plant is contained;

Figure 6 is a sectional view of that part of the apparatus in which chemical material is mixed with the sewage or waste;

Figure 7 is a longitudinal sectional view on the line 7—7 of Figure 2, and

Figure 8 is a transverse sectional view on the line 8—8 of Figure 2.

My improved treatment plant comprises a grit removing or separator unit A; a mixing unit B; a settling unit C, and a sludge-receiving unit D,—the sewage or waste being first passed through the unit A, where it is deprived of grit, stones and similar solid materials, then through the unit B where it has certain chemical material mixed therewith, then through the unit C wherein the impurities will be caused to coagulate and precipitate and the water content aerated, and finally the precipitate or sludge conveyed from the unit C to the unit D and the purified effluent discharged from the unit C to a stream or other body of water.

The unit A, (Fig. 3), comprises two elongated chambers, 1, 1, across one end of which a chamber 2 is provided; and flow from this chamber to one of the other of the elongated chambers 1, 1, is controlled by sluice gates 3, 3; a by-pass chamber 4 is located adjacent to and at one side of the chamber 2 to provide for excess or storm flow of sewage; and from the chamber 4, the excess sewage may be conveyed by a pipe 5 to a ditch or other place of deposit. The excess or storm flow will pass from the chamber 2, over a weir 6 and into the chamber 4 and in the latter, an inclined screen 7 is provided to arrest grit and stones. During normal operation of the plant, the sewage or waste is discharged, as by a pipe 8, into the chamber 2 and from the latter, past one or both of the sluice gates to one or both of the elongated chambers 1. Located within the chambers 1, near the entrance ends thereof are inclined screens 9 to arrest grit, stones and similar solid material. Intermediate the ends of each chamber are depressions 10 which are sumps or pockets in which stones and other heavy material will become deposited. At the outlet ends of the chambers 1, 1, sluice gates 11 are provided and beyond these gates, a weir 12 is located and over this weir, the sewage or waste will flow and enter a deep wall 13. During such flow over the weir 12 and into the well 13, the liquid content of the sewage or waste will be exposed in a thin sheet to the air, and the whole unit A is open at the top so that the surface of the sewage or waste will be exposed to the air and to the sunlight. The sumps or pockets 10 may be drained by suitable piping 14 and the latter may lead to a pump chamber 15 hereinafter described. The sewage or waste is conducted by a pipe 16 to the unit B. This unit includes a building 17 over a pit 18 and in this pit, the chamber 15 and a mixing chamber 15ª are located. The pipe 16 enters one end of the pit 18 and communicates with one end of a Venturi meter 19 located in said pit for measuring the flow of sewage or waste, and with the other end of this meter, one end of a pipe 20 communicates. The pipe 20 extends upwardly and forwardly and passes through a wall 21 of the chamber 15 so that the sewage or waste will be discharged into the section 15ª of chamber 15 above the bottom thereof and will be directed downwardly by a baffle 22 (Fig. 6), and flow under said baffle and rise in that portion of said chamber 15 which contains agitator 23; the sewage or waste then rises and overflows a wall or partition 24 and enters the pump section 15ᵇ of chamber 15.

A room 25, (Fig. 1 B) is provided in the building 17 for the accommodation of a supply of chemicals. The floor 26 of the room 25 supports a hopper 27 from which the chemicals are directed to the mixing chamber 15ª where said chemicals are thoroughly mixed with the sewage or waste.

Pumps 28, located in the pump section 15ᵇ of chamber 15, may be driven by suitable motors, one of said motors being indicated at 29, Figure 1. The pumps 28, serve to force the mixture of sewage or waste and chemicals through piping 30 to the settling unit C.

The settling unit C (Fig. 2) comprises two elongated tanks 31, 31, each divided into a plurality of chambers as hereinafter described, and said tanks are separated by an intermediate, elongated channel, 32, (Fig. 2 and Fig. 8), into which the precipitate or sludge from the chambers of the tanks 31 may enter through ducts 33, and the bottoms 34 of said chambers are inclined toward the lower portion of the channel 32, so that sludge shall be directed to the ducts 33. Valves or gates 35 are provided for controlling the passage of the sludge from the chambers of the tanks to the channel 32. The channel 32 is preferably open at its top and suitable piping 36 may be provided for flushing it when necessary. The bottom of the sludge channel 32 is preferably made somewhat inclined so that the sludge will be caused to gravitate toward the end of the unit C from which it is discharged. The sludge will enter a compartment 37, (Fig. 7), at one end of the unit C and in this compartment, a pump 37ª is located for forcing the sludge through a pipe 38 to unit D and enter a shallow receptacle 39, (Fig. 7 D), near a sludge bed 40, and from this receptacle, the sludge will flow to the sludge bed. The sludge bed will preferably be left uncovered so that air and sunlight may reach the same; and a framework 41 will be provided for the accommodation of a traveling crane 42 carrying a bucket 43 for handling the sludge after it shall have become dewatered. The sludge bed may be provided with perforated tile 42ª (Fig. 1 D), and a suitable drain 44, (Figs. 1 and 2) may be connected with the sludge bed and may conduct the liquid to the pump chamber 15 or to a ditch or other outlet.

One of the tanks 31 may be operated while the other is being cleaned, or both of said tanks may be operated simultaneously, as occasion may require.

Each settling tank is divided into six sections, $a$, $b$, $c$, $d$, $e$, $f$. The section $a$ (Fig. 2 C) is divided into two chambers 45, 46, formed by a baffle 47 which terminates at its lower end above the bottom of the tank so that sewage may pass from the bottom portion of chamber 45 to the bottom portion of the chamber 46. A baffle 48 is located in the section $b$ terminating above the bottom of the section and providing two chambers 49, 50 in said section $b$. A baffle 51 (also terminating above the bottom of the tank) divides the section $c$ into two chambers 52, 53. Surrounding the chamber 53 is a weir channel 54, the inner walls of which are vertical and provided at their upper edges with inwardly projecting flanges or flat weirs 55. The section $d$ is divided by a baffle 56 (which terminates above the bottom of the tank) into two chambers 57, 58. The chamber 57 is surrounded by a weir channel 59. The inner walls of this channel are provided at their edges with inwardly projecting flanges or flat weirs 60. The section $e$ of each tank is separated from the section $d$ by a wall 61 and at the top of this wall, a weir channel 62 is provided and the forward wall of this channel is provided at its upper edge with a forwardly projecting flange or flat weir 63. A scum board 65 is located near the outlet end of the section $e$. The section $f$ of each tank provides a compartment 64. A baffle 66 is located near the outlet end of this compartment and the water will flow under this baffle, (Fig. 1 C), and then upwardly, being then conducted by an inclined conductor 67 to a chamber 68, from which it will be conducted, by suitable piping 69, (Fig. 2) to a stream or other body of water.

The flow is directed through one of the tanks of the settling unit C as follows:—

The sewage or liquid waste, (with the chemicals mixed therewith) enters chamber 45 of section $a$ of one of the tanks 31 and passes down and under the baffle 47, coming up in the chamber 46 of said section; then over the adjacent partition 46ª and into chamber 49 of section *b*; then down and under the baffle 48 to the chamber 50 of section *b*; then up and over partition 50ª into the weir channel 54. From this weir channel, the sewage will flow in a thin sheet over the flat weirs 55 and into the chamber 53 of section *c*; then under the baffle 51 and into the chamber 52 of section *c*; then over partition 52ª to the wier channel 59 and then flow in a thin sheet over the flat weirs 60 and into the chamber 57 of section *d*. From this chamber, the liquid will flow under the baffle 56 and into the chamber 58 of section *d*. From the section *d*, the liquid flows over the partition wall 61 into the weir channel 62 and flows in a thin sheet over the flat weir 63 and into the chamber of section *e*. The liquid rises in this section and then flows under the scum board 65 and over a division wall into the chamber 64. It will then pass under scum board 66 of this chamber and over division wall and be finally discharged as a purified water or effluent to be directed to a stream or other body of water as previously explained.

By reason of the increased capacities of the succeeding chambers of the settling unit, the detention periods in the various tank sections increase as the liquid flows through the tank as above described. This directed flow permitting the fluid to become more quiet though still in motion, creates what is termed a "floating filter" which causes an intimate contact of the freshly finely divided particles of the treatment mixture with the solids and dissolved content of the sewage. Rapid coagulation takes place, forming flocs, which, owing to their increased weight, are overcome by gravitation, slowly settling to the bottom of the first and following compartments.

By provision of the weirs hereinbefore described, the fluid is caused to flow in thin sheets and drop into the adjacent chamber, thus effectually exposing the fluid to the atmosphere in a manner to insure efficient aeration of the fluid and the ready escape of sewage gases. Additional exposure of the liquid will be afforded during its flow over the partition walls separating various sections of the tank structure. Also the surface of the entire body of liquid in the tank is exposed at all times to the air and sunlight.

The word "sewage" as used in the claims includes domestic or other sewage or industrial waste.

Having fully described my invention what I claim as new and desire to secure by Letters-Patent, is:—

1. A sewage treatment plant, comprising a grit separator unit, a mixing unit in communication therewith, said mixing unit including means to discharge chemical material into the sewage, a settling unit, a pump chamber associated with the mixing unit, a pump in said chamber, means connecting said pump with the settling unit, a sludge bed, means for conveying sludge from the settling unit to the sludge bed, means for separately discharging water from the settling chamber, and means for draining the grit separator unit to said pump chamber.

2. A sewage treatment plant, comprising a grit separator unit, a mixing unit in communication therewith, said mixing unit including means to discharge chemical material into the sewage, a settling unit, a pump chamber associated with the mixing unit, a pump in said chamber, means connecting said pump with the settling unit, a sludge bed, means for conveying the sludge from the settling unit to the sludge bed, means for separately discharging water from the settling chamber, means for draining grit separator unit to said pump chamber, and means for draining the sludge bed to said pump chamber.

3. In a sewage treatment plant, a separator unit comprising elongated chambers and a receiving chamber at one end of said elongated chambers, said elongated chambers having pockets in the bottom thereof and screens forwardly of said pockets, a lateral chamber, a screen therein, outlet means for said lateral chamber, baffles at the rearward ends of the elongated chambers, gates for controlling the flow of sewage, a well at the rearward ends of the elongated chambers, and means for conducting sewage from said well to the mixing unit.

4. In a sewage treatment plant, the combination of a mixing unit and a settling unit, said mixing unit comprising a mixing chamber, a pump chamber communicating with the mixing chamber, means to conduct sewage to the mixing chamber, means to discharge chemical material into the mixing chamber, agitating means in the mixing chamber, pumping means in the pump chamber, and means connecting said pumping means with the settling unit.

5. In a sewage treatment plant, a settling unit comprising a tank divided into chambers through which the sewage may circulate, a sludge channel, the bottoms of the chambers of the tank sloping toward said channel, means for controlling the passage of sludge from said chambers to the sludge channel, means for forcing sludge from one end of said channel, and means for flushing said sludge channel.

6. In a sewage treatment plant, a settling unit comprising a tank divided into a plurality of sections divided by partition walls, said sections comprising chambers separated by baffles which terminate above the bottoms of the sections, weirs surrounding certain of said chambers whereby the liquid is caused to flow in thin sheets into such chambers and be exposed to the atmosphere whereby the liquid will be aerated, and means for discharging water from said unit.

7. An improved settling unit for sewage treatment comprising a sectional tank, the sections thereof being of progressively greater size from the inlet end of the tank toward the outlet end thereof, a sludge outlet for each section of the tank, means for causing sewage to flow successively through the tank sections, and means for discharging effluent from the largest section of the tank.

In testimony whereof, I have signed this specification.

JOHN T. TRAVERS.